United States Patent [19]

Sarugaku et al.

[11] Patent Number: 4,556,777

[45] Date of Patent: Dec. 3, 1985

[54] METHOD AND APPARATUS FOR WELDING LINE TRACER CONTROL

[75] Inventors: Shinichi Sarugaku, Narashino; Akira Tsuchihashi, Nagareyama; Masao Tsuji, Funabashi, all of Japan

[73] Assignees: Hitachi, Ltd., Tokyo; Hitachi Keiyo Engineering Co., Ltd., Narashino, both of Japan

[21] Appl. No.: 565,199

[22] Filed: Dec. 23, 1983

[30] Foreign Application Priority Data

Dec. 27, 1982 [JP] Japan ................................ 57-226888

[51] Int. Cl.⁴ .............................................. B23K 9/12
[52] U.S. Cl. ............................ 219/124.34; 219/125.12
[58] Field of Search ...................... 219/124.34, 124.22, 219/125.12

[56] References Cited

U.S. PATENT DOCUMENTS

| 3,975,616 | 8/1976 | Siktberg et al. | 219/137.71 |
| 4,158,124 | 6/1979 | Connell | 219/125.12 |
| 4,417,126 | 11/1983 | Kasahara et al. | 219/124.34 |
| 4,441,011 | 4/1984 | Nomura et al. | 219/124.34 |

FOREIGN PATENT DOCUMENTS

| 0033127 | 8/1981 | European Pat. Off. . |
| 2028728 | 6/1970 | Fed. Rep. of Germany . |
| 1460173 | 12/1976 | United Kingdom . |

Primary Examiner—Clifford C. Shaw
Attorney, Agent, or Firm—Beall Law Offices

[57] ABSTRACT

In welding effected by weaving an electrode, welding current or voltage is applied to a frequency analyzer, for deriving a frequency component having the same period as a weaving period and a doubled frequency component having a period which is half the weaving frequency. The center of weaving motion is corrected in relation to the two frequency components to thereby effect tracer control for the electrode.

20 Claims, 8 Drawing Figures

METHOD AND APPARATUS FOR WELDING LINE TRACER CONTROL

This invention relates to a method and an apparatus for controlling a welding torch in weaving welding utilizing a consumptive electrode and more particularly to method and apparatus for tracer control of a welding torch along a welding line in accordance with changes in welding current or voltage.

The weaving welding has hitherto been known as an example of arc welding. This type of welding has widely been used when steel plates sharing a V-shaped groove are butt-welded or wall surfaces are filled-welded at their crossing portions. In the weaving welding, the welding torch is periodically swung and welding line tracer control technique has been available wherein the center of the swinging torch is corrected by comparing welding currents or voltages occurring at transverse peaks of the periodical swinging of the torch, so as to follow the welding line.

Figure 1:
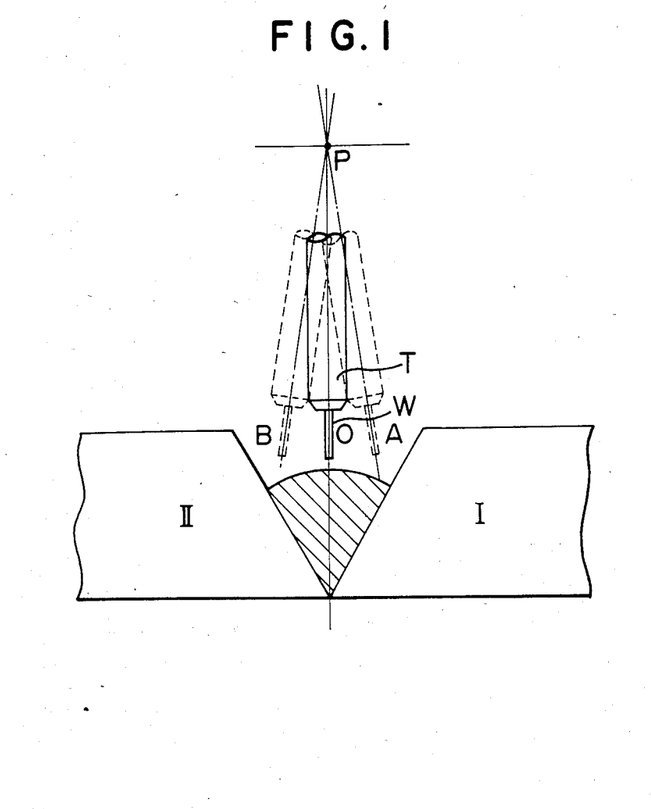
FIG. 1 is a diagrammatic representation for explaining weaving welding at a V-shaped groove.
Figure 2:
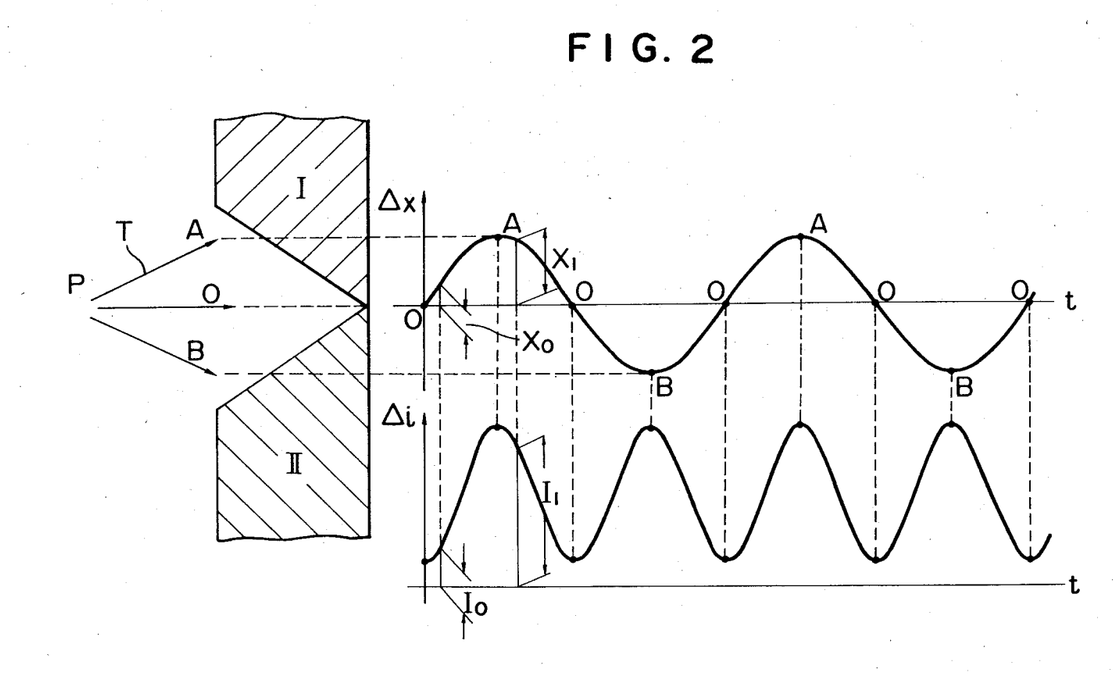
FIGS. 2 and 3 are waveform diagrams respectively showing the relation between weaving motion and change of welding current which is theoretically established in the course of weaving welding.

Detection of welding current in the welding line tracer control technique will be described with reference to the accompanying drawings. FIG. 1 shows a method of weaving welding in butt-welding steel plates I and II sharing a V-shaped groove. A welding torch assuming a central posture oriented to a pointed end of the V-shaped groove on a line connecting the pointed end and a point P is swung transversely by a predetermined amplitude and at a predetermined period ($O\rightarrow A\rightarrow O\rightarrow B\rightarrow O\ldots$). When the welding torch T is swung in this way, welding current flowing through a welding wire W changes by $\Delta i$ with a change $\Delta x$ in swinging of the torch (FIG. 2). Specifically, since peaks of the changing welding current occur when the weaving amplitude of the welding torch reaches extremities A and B, the welding current changes at a period which is twice that of the swinging of weaving motion. In the event that the center of weaving motion of the welding torch T is displaced by $\eta$ from the pointed end of the V-shaped groove, the weaving amplitude of the welding torch T and the welding current responsive thereto change as will be described with reference to FIG. 3. More particularly, the center O of the weaving amplitude is displaced by $\eta$ from the posture O' of the welding torch T oriented to the pointed end of the V-shaped groove and as a result, the weaving amplitude takes an upper waveform in FIG. 3 which results from upward translational motion by $\eta$ of an upper waveform in FIG. 2. As in the case of FIG. 2, peaks of the welding current occur when the welding torch T reaches extremities A and B but in the case of FIG. 3, at the extremities A and B, the tip of the welding wire W extending from the welding torch T is differently distant from the surface of the V-shaped groove shared by the steel plates to be welded together with the result that adjacent peaks have different levels. In particular, welding current corresponding to the extremity A is larger than that corresponding to the extremity B. Further, while the bottom of the changing welding current occurs corresponding to the center O of the weaving motion in the case of FIG. 2, the bottom in the case of FIG. 3 occurs corresponding to the posture O', shifted from the center O, at which the welding torch T is oriented to the pointed end of the V-shaped groove.

Conventionally, in order to correct the shift of the welding torch T from the pointed end of the V-shaped groove, a control signal for correcting the welding torch T is calculated by comparing peak levels of the welding current corresponding to the extremities A and B or by comparing integrated values of the welding current over predetermined intervals.

Such a method is used in arc welding of the weaving type for controlling the swinging center of the torch by detecting changes in the welding current as described above and this method can advantageously be applied to welding in a narrow field because any special sensor for torch position detection can be dispensed with and a structure associated with the torch can be simplified and miniaturized. This method is also advantageous in that it will not be affected by heat, light, sputter and fume resulting from arc phenomenon. Arcing is, however, sensitive to changes in the surface condition of an object to be welded and undergoes sophisticated changes due to thermal melting of the consumptive electrode and current change therein.

Figure 4A:
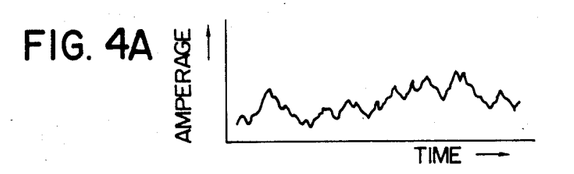
FIG. 4A is a waveform diagram showing changes of actual welding current.
Figure 4B:
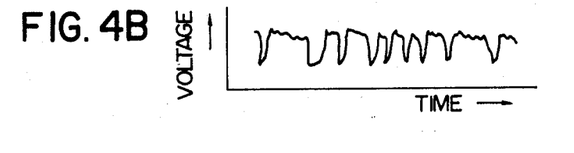
FIG. 4B is a waveform diagram showing changes of actual welding voltage.

Generally, the arc phenomenon is mainly classified into short arcing and spray arcing. Under a short arcing condition, current changes at a period which is far shorter than that of swinging motion. Under the short arcing condition, as well known in the art, a consumptive electrode fed out of a feeder comes into contact with a workpiece and short-circuit current flows so that the consumptive electrode is molten by the short-circuit current to cause arc current flow. The consumptive electrodes are sequentially fed out so as to make the above phenomenon repeat. This phenomenon contains abrupt changes as shown in FIGS. 4A and 4B and repeats at a relatively stable period of 30 Hz. Because of this phenomenon, it is difficult under the short arcing condition to detect the current change responsive to the swinging period of the torch and especially, it is almost impossible to detect and control the peak current responsive to the swinging motion.

Problems are also involved in spray arcing. More particularly, with large welding current, an object being welded is molten by the current and the welding wire is molten into spherical slugs which in turn stay in a V-shaped groove, thereby adding a rounded raise to the surface of the workpiece being welded. Consequently, even when the welding torch is swung, the distance between the workpiece surface and the tip of the welding wire W remains unchanged with the result that welding current will not change periodically in contrast to the illustration given in FIGS. 2 and 3 but will change in a very sophisticated manner, thereby making it difficult to use the change of current as control information.

The present invention is developed to overcome the prior art drawbacks set forth above and has for its object to provide method and apparatus for welding line tracer control which derives specified frequency components from a sophisticated waveform indicative of changes of welding current or voltage and utilizes the frequency components for correction of the welding torch, thereby achieving welding line tracer control with highly accurate follow-up.

To accomplish the above object, according to the present invention, in weaving welding wherein a consumptive electrode is swung at a predetermined period along a welding line for electric welding of an object, the frequency of a waveform indicative of changes of welding current or voltage is analized and on the basis of one frequency component having the same period as that of the swinging motion and the other frequency component having a period which is half the swinging period, weaving operation is so controlled as to reduce the one frequency component.

As has been explained in describing the prior art, a welding line for a horizontal fillet welded groove lies on a mating portion between two walls. When the welding torch is swung to effect arc welding near the two walls, welding current is generally maximized at the walls and minimized near the welding line whereas welding voltage is minimized at the walls and maximized near the welding line. Accordingly, it follows that two peaks and two bottoms occur during one swinging period. As well known in the art, the welding line is in register with the center of swinging motion when the two peaks are set to have the same level. Arc phenomenon is sophisticated and subject to abrupt changes but it is especially of significance to take care of a swinging period and a period which is half the swinging period in order to make equal levels of the two peaks of interest occurring during each one period of swinging motion.

Thus, according to one aspect of the present invention, there is provided a method for welding line tracer control in which, in weaving welding, changes in welding current flowing through an electrode or in welding voltage are detected to tracer control a welding torch along a welding line, wherein a swinging frequency component having the same period as a weaving period and a doubled swinging frequency component having a period which is half the weaving period are derived from a detected change in welding current or voltage, and these swinging frequency components are put into a calculation for producing a control output which corrects the center position of weaving motion.

According to another aspect of the present invention, there is provided an apparatus for welding line tracer control comprising a welding torch, torch support means movably supporting the welding torch for its movement in at least two directions, swinging means for effecting weaving motion of the torch support means in one direction, means for moving the torch support means in a direction along a welding line, detection means for detecting changes in welding current flowing through a consumptive electrode or in welding voltage, Fourier function transform means for deriving, from a change in welding current or voltage detected by the detection means, a swinging frequency component having the same period as a weaving period and a doubled swinging frequency component having a period which is half the weaving period, and control means responsive to a control output from the Fourier function transform means, for correcting the center position of weaving motion of the welding torch.

Figure 3:
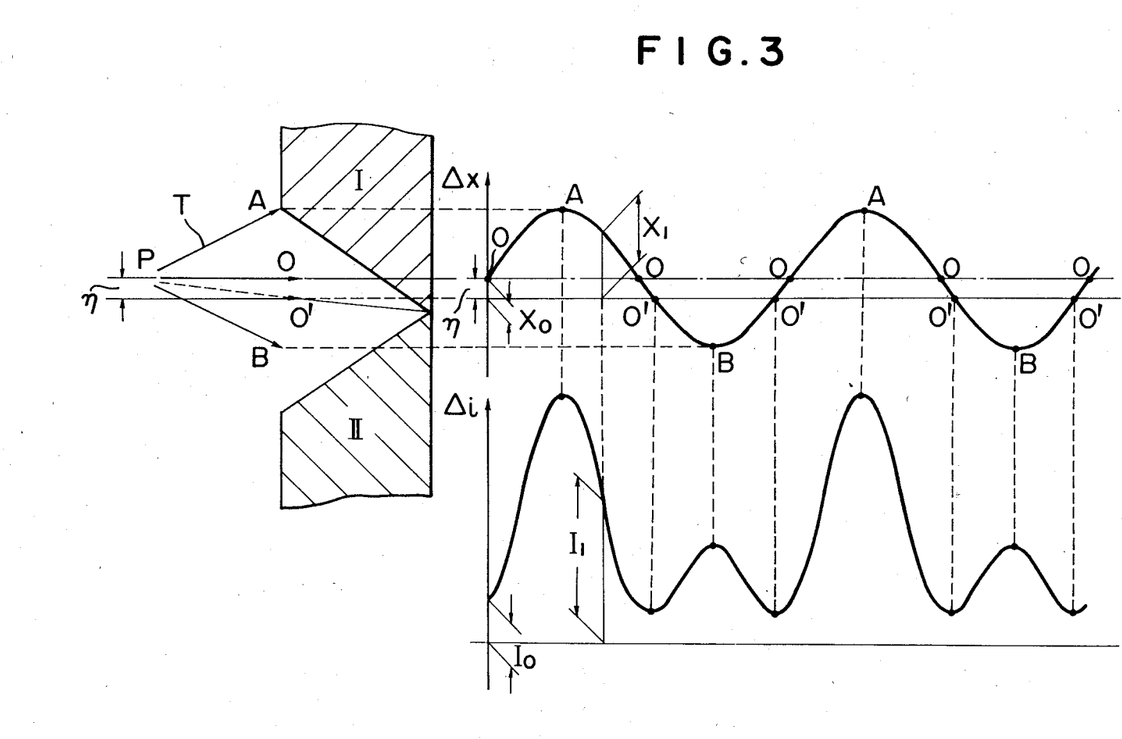

The essential idea of the present invention will now be described in greater detail. In the foregoing description of the prior art, the change of welding current in response to the positioned change of electrode which takes place in the weaving welding operation when the swinging center of weaving motion is in register with the pointed end of the V-shaped groove has already been explained with reference to FIG. 2. Starting from the condition of FIG. 2, let us consider a case wherein the swinging center of weaving motion is not in register with the pointed end of the V-shaped groove but shifts therefrom by $\eta$ as shown in FIG. 3. Then, welding current in this case can be determined by measuring values of welding current $I_0, I_1, \ldots$ in FIG. 2 corresponding to displacement, $X_0, X_1, \ldots$ in FIG. 3. A waveform indicative of the change of welding current in FIG. 3 is thus obtained. This waveform is found to be approximated to a composite waveform containing a frequency component (having a period which is half the swinging period of weaving motion and corresponding to the doubled swinging frequency component mentioned previously) belonging to a waveform indicative of the change of welding current shown in FIG. 2 and another frequency component which is half the former frequency component (thus having a period equal to the swinging period of weaving motion and corresponding to the swinging frequency component mentioned previously).

In other words, when the swinging center of weaving motion is in register with the pointed end of the V-shaped groove, the waveform of changing welding current is generated which contains the doubled swinging frequency component having a period which is half the weaving period whereas when the swinging center of weaving motion is not in register with the pointed end of the V-shaped groove, the composite waveform of changing welding current is generated which contains the doubled swinging frequency component and the swinging frequency component having a frequency which is half that of the former component and a period equal to the weaving period (twice the period of the former component). Gathering from this fact, it will be understood that by deriving the swinging frequency component and the doubled swinging frequency component from the waveform indicative of the change of welding current and controlling the swinging center of weaving motion such that the swinging frequency component is removed from the waveform of changing welding current and the doubled swinging frequency component becomes predominant, tracer control of a welding torch along a welding line can be accomplished.

In a preferred embodiment of the present invention, the control output for correcting the position of the swinging center of weaving motion is delivered out when a waveform indicative of the swinging of weaving motion comes into a specified state.

In another preferred embodiment of the present invention, the waveform indicative of the swinging of weaving motion is a sine wave having a given amplitude A and when the swinging frequency component and the doubled swinging frequency component, both derived from the waveform indicative of the change of welding current in response to the weaving motion, have an amplitude $D_1$ and an amplitude $D_2$, respectively, the control output is delivered out in synchronism with $$\frac{-jA}{4} \cdot \frac{D_1}{D_2}$$

where j represents the imaginary unit. The swinging waveform of weaving motion may be a composite sine wave containing two or more sine waves of different periods. A similar tracer control can be accomplished by detecting welding voltage in place of welding current.

Figure 5:
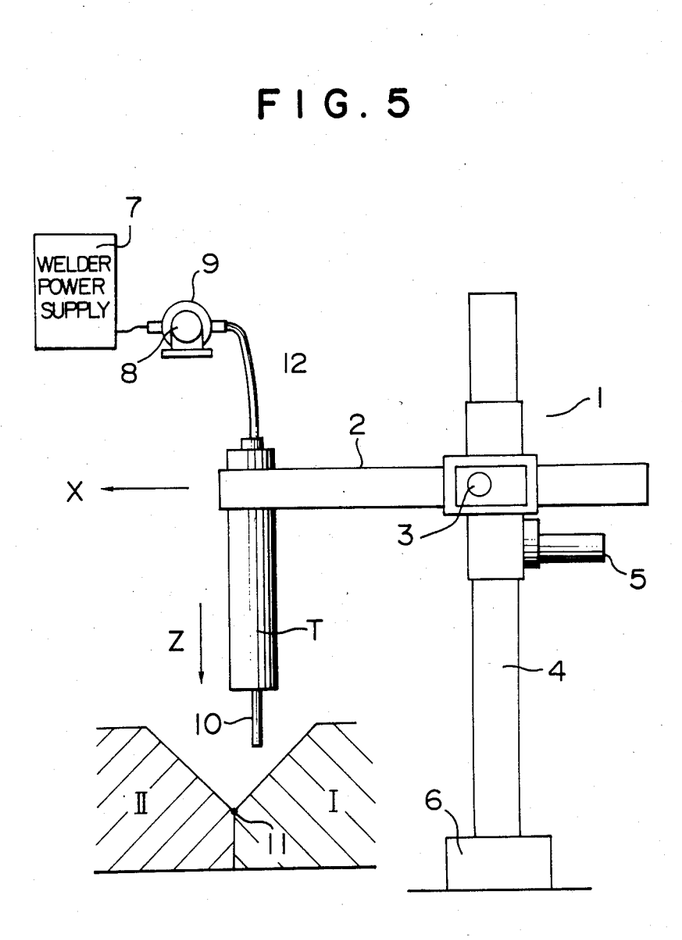
FIG. 5 is a schematic diagram showing an automatic welding apparatus for implementation of a method of the present invention.

Referring now to FIG. 5, there is shown an automatic welding apparatus implementing the present invention which specifically utilizes an orthogonal type robot. The automatic welding apparatus comprises an arc welding torch T, a horizontal shaft 2 carrying the welding torch T at its fore end and being movable in the horizontal direction (X direction in FIG. 5), a drive motor 3 for moving the horizontal shaft 2 in the X direction, a vertical shaft 4 for movably supporting the horizontal shaft 2 in the vertical direction (Z direction in FIG. 5), a drive motor for moving the vertical shaft 4 in the Z direction, a traveling shaft 6 by which a robot 1 as a whole can travel in a welding direction, a power supply 7 for the welder, a welding wire feed motor 8, a welding wire reel 9, and a welding wire 10. Associated with the apparatus are objects to be welded I and II.

This automatic welding apparatus is adapted to butt-weld the objects I and II at a V-shaped groove and in welding, the welding torch T undergoes weaving motion in the X direction while the robot 1 travels on the traveling shaft 6 along a welding line which extends in a direction normal to a sheet of the drawing. The robot used in the automatic welding apparatus is not limited to the orthogonal type herein presented for illustration only but it may be of a polar coordinate type or an articulated type.

Figure 6:
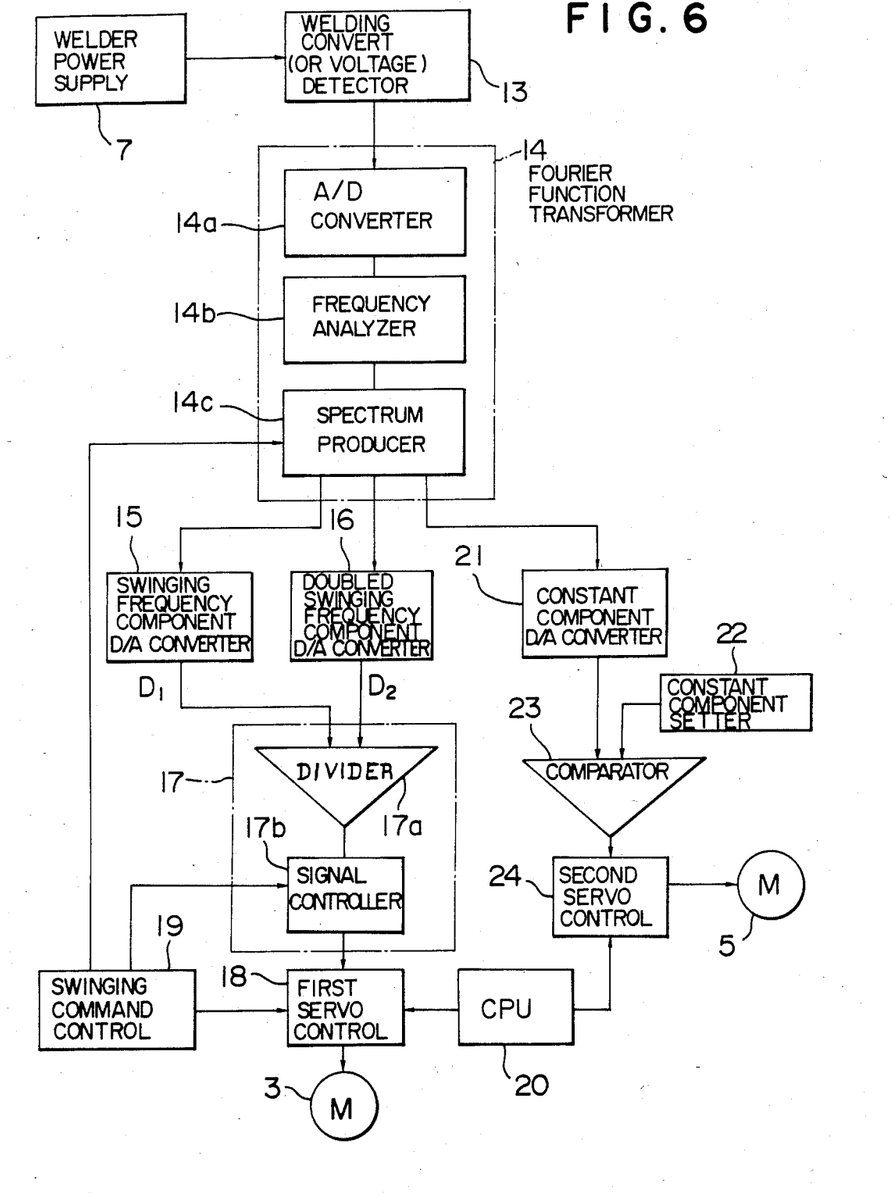
FIG. 6 is a block diagram of a control circuit for controlling the apparatus of the present invention.

A control circuit for controlling the automatic welding apparatus of FIG. 5 is shown, in block form, in FIG. 6.

The drive motor 3 for horizontal drive, the drive motor 5 for vertical drive, and the welder power supply 7 are also seen in FIG. 6. A welding current detector 13 is adapted to detect a change in the welding power supply during welding and convert it into a control signal. A Fourier function transformer (FET) 14 includes an A/D converter 14a, a frequency analyzer 14b and a spectrum producer 14c. The spectrum producer 14c distributes a swinging frequency component, a doubled swinging frequency component and a constant component to corresponding processing units. Such a Fourier function transformer has been known in the past and any types may be used. A swinging frequency component D/A converter 15 and a doubled swinging frequency component D/A converter 16 receive the corresponding outputs from the spectrum producer 14c included in the FET 14 and produce D/A converted outputs $D_1$ and $D_2$ applied to a succeeding signal processor. As described previously, the swinging frequency component is a frequency component which is created in the periodically changing welding current when the swinging center of weaving motion of the welding torch displaces from the pointed end of the V-shaped groove, and the doubled swinging frequency component is a frequency component having a period which is twice a period of the swinging frequency component, the latter frequency component being created owing to the normal weaving motion. A signal processor 17 determines a ratio between the outputs of the swinging frequency component D/A converter 15 and doubled swinging frequency component D/A converter 16 and produces a signal commanding a swinging motion. The signal processor 17 includes a comparator 17a for comparing the swinging frequency component with the doubled swinging frequency component and a signal controller 17b for producing a control signal in accordance with an output from the comparator 17a.

A first servo control 18 is responsive to the control signal from the signal controller 17b to supply a control command to the horizontal shaft drive motor 3. A swinging command control 19 supplies to the first servo control 18 a swinging command for driving the horizontal shaft drive motor 3 and controls the spectrum producer 14c, for commanding the swinging frequency component and the doubled swinging frequency component. The swinging command control 19 also controls the signal processor 17, for commanding a timing at which the signal controller 17b delivers an output.

A central processing unit (CPU) incorporating a storage for storing contents of welding operations in the automatic welding apparatus instructs the swinging command control 19 of a swinging waveform, instructs the first servo control 18 of such parameters as a welding position, a welding speed and a welding acceleration so as to control these parameters, and instructs the first servo control 18 to operate an output command from the signal processor 17.

A constant component D/A converter 21 produces a signal which in turn is compared with a preset value from a constant component setter 22 at a comparator 23, for controlling the vertical shaft drive motor 5 such that the height of the consumptive electrode 10 from the workpieces I and II is controlled to a given value at which a constant component contained in the welding current coincides with the preset value of the setter 22.

A second servo control 24 receives, like the first servo control, such parameters as a welding position, a welding speed and a welding acceleration so as to control the vertical shaft drive motor 5.

The manner of frequency analysis underlying the FIG. 6 control circuit of the present invention and its theoretical ground will now be described specifically in greater detail.

Where the consumptive electrode 10 as shown in FIG. 5 transiently swings by a distance x with respect to the center of weaving motion, the weaving motion center is displaced by $\eta$ from an optimum welding line (normal to a sheet of the drawing) on a pointed end 11 of the V-shaped groove shared by the workpieces I and II, the amplitude of the weaving motion is A, and a swinging function W(t) is a function to time t (where $|W(t)| \leq 1$), the distance x is given as, $$x = A \cdot W(t) + \eta \tag{1}$$

Using as the function W(t) a symmetric, periodical function having a period T, $$W(t + T/2) = -W(t) \tag{2}$$

is held.

Figure 7:
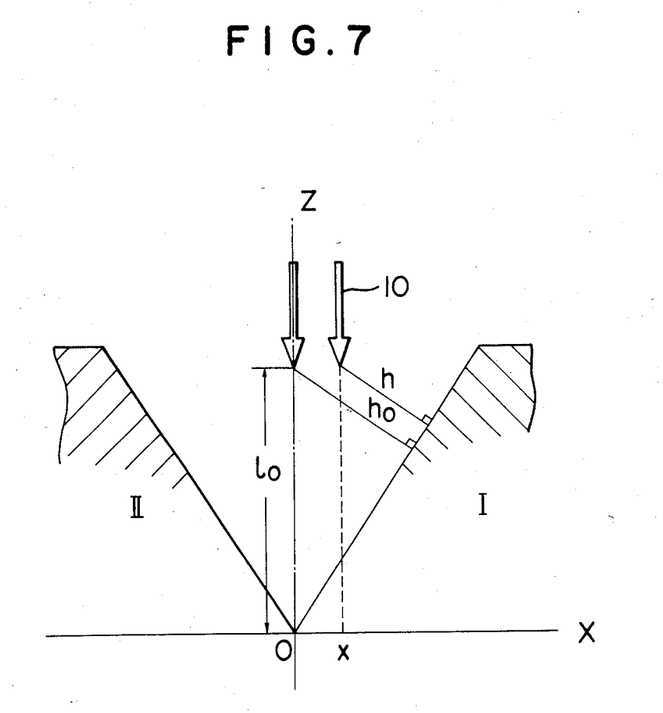
FIG. 7 is a diagrammatic representation useful in explaining the essential idea of the present invention.

Reference is then made to FIG. 7 schematically showing the V-shaped groove subject to the weaving welding. When the tip of the consumptive electrode 10 extending from the welding torch is distant by $l_0$ from the pointed end of the V-shaped groove, the height h of the consumptive electrode 10 from a side surface of the V-shaped groove is expressed as a function of x by the following equation since the consumptive electrode shifts by x in the X direction during the weaving motion:

$$h = f(x) + l_0 \quad (3)$$

Through experiments, the welding current I is proven to be expressed as a linear function of h:

$$I = -ah + 1 \quad (4)$$

where a and b are positive constants.

By combining equations (1), (3) and (4), the welding current I can be expressed by the following equation as a function of time t:

$$I(t) = -a(f(AW(t)+\eta)+l_0)+b$$

This function is converted through Fourier transform as follows:

$$G(k) = \int_{\rho}^{\rho+T} I(t)e^{-jkt} dt \quad (5)$$

where $\rho$ is an optical real number and the proportional constant is omitted for simplicity of expression. Consider a component which is n times the swinging frequency to provide $$G(n\omega) = \int_{\rho}^{\rho+T} I(t)e^{-jn\omega t} dt$$

which can be reduced by utilizing the relation of equation (2) to, $$G(n\omega) = \int_{-\frac{T}{2}}^{\frac{T}{2}} I(t)e^{-jn\omega t} dt \quad (6)$$

Since $\omega = 2\pi/T_0$ and $$\int_{-\frac{T}{2}}^{\frac{T}{2}} C \cdot e^{-jn\omega t} dt = 0, \quad (7)$$

equation (6) reduces to, $$G(n\omega) = -a \int_{-\frac{T}{2}}^{\frac{T}{2}} f(x)e^{-jn\omega t} dt. \quad (8)$$

Assuming that $f(x) = g(x/A)$ and $\eta = A\xi$, $$f(AW(t)+\eta) = g(W(t)+\xi) \quad (9)$$

is given, which is subjected to the Taylor expansion around $\xi$ to reduce to, $$g(W(t)+\xi) = \sum_{m=0}^{\infty} \frac{W(t)^m}{m!} \cdot g^{(m)}(\xi) \quad (10)$$

where $g_{(s)}^{(m)} = d^m g(s)/ds^m$.

Therefore, $$G(n\omega) = -a \int_{-\frac{T}{2}}^{\frac{T}{2}} \sum_{m=0}^{\infty} \frac{W(t)^m}{m!} \cdot g^{(m)}(\xi) e^{-jn\omega t} dt. \quad (11)$$

From termwise integration of equation (10), $$G(n\omega) = -a \sum_{m=0}^{\infty} \frac{g^{(m)}(\xi)}{m-!} \int_{-\frac{T}{2}}^{\frac{T}{2}} W^m(t) \cdot e^{-jn\omega t} dt \quad (12)$$

results. Then, $$C_{m,n} = \int_{-\frac{T}{2}}^{\frac{T}{2}} W(t)^m e^{-jn\omega t} dt \quad (13)$$

is put down wherein $C_{m,n}$ is a constant which depends on the swinging function W(t).

By putting into equation (11) the following equation (14)

$$D_m = \frac{g^{(m)}(\xi)}{m!}, \quad (14)$$

$$G(n\omega) = -a \sum_{m=0}^{\infty} C_{mn} D_m \quad (15)$$

is obtained. G (n$\omega$) is a value which can be determined from numerical integration. When $$\frac{G(n\omega)}{-a}$$

and $D_m$ are respectively represented by vectors G and D, and $C_{m,n}$ is represented by a matrix M, expressions $$G = \begin{pmatrix} \frac{G(\omega)}{-a} \\ \frac{G(2\omega)}{-a} \\ \vdots \\ \frac{G(n\omega)}{-a} \\ \vdots \end{pmatrix}$$

$$D = \begin{pmatrix} g(\xi) \\ g^{(1)}(\xi) \\ \frac{g^{(2)}(\xi)}{2} \\ \frac{g^{(3)}(\xi)}{3!} \\ \vdots \\ \frac{g^{(m)}(\xi)}{m!} \end{pmatrix}$$

are given and $$G = MD \quad (16)$$

stands. From equation (16), $$D = M^{-1}G \quad (17)$$

is obtained through algebraic procedure.

If $g^{(m)-1}$ is known from a certain m, then from equation (14), $$\xi = g^{(m)-1}(m!D_m) \quad (18)$$

is obtained. Accordingly, $\eta$ can be determined from $$\eta = Ag^{(m)-1}(m!D_m) = A^{1-m}f^{(m)-1}(m!D_m) \quad (19)$$

As will be seen from the above, by choosing a suitable swinging function W(t) to express the welding current as a function of the swinging function, the displacement $\eta$ from the center of weaving motion can be determined through the Fourier transform and computations. When the thus determinable displacement $\eta$ is detected and used as a command for correcting the position of the welding torch in the X direction, the welding torch of the automatic welding apparatus can be brought into register with the welding line.

Taking $x = A \sin \omega t + \eta$ $$W(t) = A \sin \omega t$$

$$f(x) = -\frac{x^2}{B}$$

where B is a real number unequal to zero, for instance, $$I = \frac{a}{B} x^2 + I_0 + b$$

$$g(y) = f(Ay) = -\frac{A^2}{B} y^2$$

$$g^{(1)}(y) = -\frac{2A^2}{B} y$$

$$g^{(2)}(y) = -\frac{2A^2}{B} \text{ and } g^{(3)}(y) = 0$$

are held. From equation (13), $$C_{0,n} = 0, \ C_{1,1} = \frac{T}{2j}, \ C_{2,1} = 0, \ C_{1,2} = 0 \text{ and}$$

$$C_{2,2} = -\frac{T}{4}. \text{ From equation (14)}, \ D_1 = -\frac{2A^2}{B} \xi \text{ and}$$

$$D_2 = -\frac{2A^2}{2B}. \text{ From equation (15)},$$

$$\frac{G(\omega)}{-a} = \sum_m C_{m1} D_m = C_{11} D_1$$

$$= \frac{T}{2j}\left(-\frac{2A^2}{B}\xi\right) = \frac{-TAj\eta}{B}$$

$$\frac{G(2\omega)}{-a} = \sum_m C_{m2} D_m = C_{22} D_2$$

-continued $$= -\frac{T}{4}\left(-\frac{2A^2}{2B}\right) = \frac{TA^2}{4B}.$$

Accordingly, $$\eta = -\frac{jA}{4} \cdot \frac{G(\omega)}{G(2\omega)} \quad (20)$$

is obtained, providing the real number $\eta$ standing for the output of the first servo control 18 shown in FIG. 6. Equation (20) contains the imaginary unit j as a multiplier but $G(\omega)$ and $G(2\omega)$ are complex numbers and $\eta$ becomes a real number.

The present invention is in no way limited to the foregoing embodiment but various changes and modification may be made without departing from the sprit of the invention. For example, the welding current detector 13 in FIG. 6 may be replaced by a welding voltage detector.

We claim:

1. A method for welding line tracer control in which, during welding effected by weaving an electrode, changes in welding current flowing through the electrode are detected to tracer-control a welding torch along a welding line, wherein a swinging frequency component having the same period as a weaving period and a doubled swinging frequency component having a period which is half the weaving period are derived from a detected change in welding current, and a control output is produced to control means for controlling the center position of weaving motion of said torch to move in a direction perpendicular to said welding line until a ratio between said swinging frequency component and said doubled swinging frequency component corresponds to a predetermined value.

2. A method for welding line tracer control according to claim 1 wherein the control output for controlling the center position of the weaving motion is delivered out when a waveform indicative of the swinging of the weaving motion comes into a specified state.

3. A method for welding line tracer control according to claim 2 wherein the waveform indicative of the swinging of the weaving motion is a sine wave having a given amplitude A and when the swinging frequency component and the doubled swinging frequency component, both derived from the waveform indicative of the change of welding current in response to the weaving motion, have an amplitude $D_1$ represented by a complex number and an amplitude $D_2$ represented by a complex number, respectively, the control output is delivered out in accordance with $$\frac{-jA}{4} \cdot \frac{D_1}{D_2}$$

where j represents the imaginary unit.

4. A method for welding line tracer control according to claim 3 wherein said swinging waveform of weaving motion is a composite sine wave containing two or more sine waves of different periods.

5. A method for welding line tracer control according to claim 1 wherein a waveform indicative of the swinging of the weaving motion is a sine wave having a given amplitude A and when the swinging frequency component and the doubled swinging frequency component, both derived from the waveform indicative of the change of welding current in response to the weaving motion, have an amplitude $D_1$ represented by a complex number and an amplitude $D_2$ represented by a complex number, respectively, the control output is delivered out in accordance with $$\frac{-jA}{4} \cdot \frac{D_1}{D_2}$$

where j represents the imaginary unit.

6. A method for welding line tracer control according to claim 5 wherein said swinging waveform of weaving motion is a composite sine wave containing two or more sine waves of different periods.

7. An apparatus for welding line tracer control comprising:
a welding torch with a welding wire serving as a consumptive electrode;
torch support means movably supporting said welding torch for its movement in at least two directions;
swinging means for effecting weaving motion of said torch support means in one direction;
means for moving said torch support means in a direction along a welding line;
detection means for detecting changes in welding current flowing through the consumptive electrode;
Fourier function transform means for deriving, from a change in welding current detected by said detection means, a swinging frequency component having the same period as a weaving period and a doubled swinging frequency component having a period which is half the weaving period; and
control means for controlling the center position of weaving motion of said welding torch to move in a direction perpendicular to said welding line until a ratio between said swinging frequency component and said doubled swinging frequency component corresponds to a predetermined value.

8. A method for welding line tracer control in which, during welding effected by weaving an electrode, changes in welding voltage are detected to tracer-control a welding torch along a welding line, wherein a swinging frequency component having the same period as a weaving period and a doubled swinging frequency component having a period which is half the weaving period are derived from a detected change in welding voltage, and a control output is produced to control means for controlling the center position of weaving motion of said torch to move in a direction perpendicular to said welding line until a ratio between said swinging frequency component and said doubled swinging frequency component corresponds to a predetermined value.

9. A method for welding line tracer control according to claim 8 wherein the control output for controlling the center position of the weaving motion is delivered out where a waveform indicative of the swinging of the weaving motion comes into a specified state.

10. A method for welding line tracer control according to claim 9 wherein a waveform indicative of the swinging of the weaving motion is a sine wave having a given amplitude A and when the swinging frequency component and the doubled swinging frequency component, both derived from the waveform indicative of the change of welding voltage in response to the weaving motion, have an amplitude $D_1$ represented by complex number and an amplitude $D_2$, represented by a complex number respectively, the control output is delivered out in accordance with $$\frac{-jA}{4} \cdot \frac{D_1}{D_2}$$

where j represents the imaginary unit.

11. A method for welding line tracer control according to claim 10 wherein said swinging waveform of weaving motion is a composite sine wave containing two or more since waves of different periods.

12. A method for welding line tracer control according to claim 8 wherein a waveform indicative of the swinging of the weaving motion is a sine wave having a given amplitude A and when the swinging frequency component and the doubled swinging frequency component, both derived from the waveform indicative of the change of welding voltage in response to the weaving motion, have an amplitude $D_1$ represented by complex number and an amplitude $D_2$ represented by a complex number, respectively, the control output is delivered out in accordance with $$\frac{-jA}{4} \cdot \frac{D_1}{D_2}$$

where j represents the imaginary unit.

13. A method for welding line tracer control according to claim 12 wherein said swinging waveform of weaving motion is a composite sine wave containing two or more sine waves of different periods.

14. An apparatus for welding line tracer control comprising:
a welding torch with a welding wire serving as a consumptive electrode;
torch support means movably supporting said welding torch for its movement in at least two directions;
swinging means for effecting weaving motion of said torch support means in one direction;
means for moving said torch support means in a direction along a welding line;
detection means for detecting changes in welding voltage;
Fourier function transform means for driving, from a change in welding voltage detected by said detection means, a swinging frequency component having the same period as a weaving period and a doubled swinging frequency component having a period which is half the weaving period; and
control means for controlling the center position of weaving motion of said welding torch to move in a direction perpendicular to said welding line until a ratio between said swinging frequency component and said doubled swinging frequency component corresponds to a predetermined value.

15. A method for controlling a weaving welding torch to trace a welding line, comprising the steps of:
detecting changes in welding current flowing through an electrode;
deriving a swinging frequency component from the detected changes in the welding current, said swinging frequency component having the same period as a weaving period of said welding torch; and moving the center position of weaving motion of said welding torch in a direction perpendicular to said welding line until said detected swinging frequency component corresponds to a predetermined value.

16. A method of controlling a weaving welding torch according to claim 15, wherein said predetermined value is zero.

17. A method for controlling a weaving welding torch to trace a welding line, comprising the steps of:
    detecting changes in welding voltage;
    deriving a swinging frequency component from the detected change in the welding voltage, said swinging frequency component having the same period as a weaving period of said welding torch; and
    moving the center position of weaving motion of said welding torch in a direction perpendicular to said welding line until said detected swinging frequency component corresponds to a predetermined value.

18. A method for controlling a weaving welding torch according to claim 17, wherein said predetermined value is zero.

19. An apparatus for welding line tracer control comprising:
    a welding torch with a welding wire serving as a consumptive electrode;
    torch support means movably supporting said welding torch for its movement in at least two directions;
    swinging means for effecting weaving motion of said torch support means in one direction;
    means for moving said torch support means in a direction along a welding line;
    detection means for detecting changes in welding current flowing through the consumptive electrode;
    Fourier function transform means for deriving, from a change in welding current detected by said detection means, a swinging frequency component having the same period as a weaving period; and
    control means for controlling the center position of weaving motion of said welding torch to move said welding torch in a direction perpendicular to said welding line until said detected swinging frequency component corresponds to a predetermined value.

20. An apparatus for welding line tracer control comprising:
    a welding torch with a welding wire serving as a consumptive electrode;
    torch support means movably supporting said welding torch for its movement in at least two directions;
    swinging means for effecting weaving motion of said torch support means in one direction;
    means for moving said torch support means in a direction along a welding line;
    detection means for detecting changes in welding voltage flowing through the consumptive electrode;
    Fourier function transform means for deriving, from a change in welding voltage detected by said detection means, a swinging frequency component having the same period as a weaving period; and
    control means for controlling the center position of weaving motion of said welding torch to move said welding torch in a direction perpendicular to said welding line until said detected swinging frequency component corresponds to a predetermined value.

* * * * *